United States Patent
Nakamura et al.

(10) Patent No.: US 11,505,071 B2
(45) Date of Patent: Nov. 22, 2022

(54) REGENERATIVE BRAKING CONTROL METHOD AND REGENERATIVE BRAKING CONTROL DEVICE

(71) Applicant: NISSAN MOTOR CO., LTD., Yokohama (JP)

(72) Inventors: Yohei Nakamura, Kanagawa (JP); Masafumi Kuroda, Kanagawa (JP); Yuji Wada, Kanagawa (JP); Michihiko Matsumoto, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 268 days.

(21) Appl. No.: 16/771,018

(22) PCT Filed: Dec. 15, 2017

(86) PCT No.: PCT/JP2017/045164
§ 371 (c)(1),
(2) Date: Jun. 9, 2020

(87) PCT Pub. No.: WO2019/116553
PCT Pub. Date: Jun. 20, 2019

(65) Prior Publication Data
US 2021/0162869 A1 Jun. 3, 2021

(51) Int. Cl.
*B60L 7/18* (2006.01)

(52) U.S. Cl.
CPC ............. *B60L 7/18* (2013.01); *B60L 2240/14* (2013.01); *B60L 2250/28* (2013.01); *B60L 2260/26* (2013.01)

(58) Field of Classification Search
CPC .... B60L 7/18; B60L 2240/14; B60L 2250/28; B60L 2260/26; B60W 10/08; B60W 10/184; B60W 10/196; B60W 30/18127
See application file for complete search history.

(56) References Cited

U.S. PATENT DOCUMENTS

| | | | |
|---|---|---|---|
| 2006/0102394 A1* | 5/2006 | Oliver | F16D 61/00 180/65.265 |
| 2012/0136547 A1* | 5/2012 | Miyazaki | B60L 3/108 701/70 |
| 2015/0032353 A1* | 1/2015 | Ajiro | B60T 13/662 303/3 |
| 2017/0113675 A1 | 4/2017 | Oguri | |
| 2018/0118034 A1* | 5/2018 | Zenner | B60L 7/26 |

FOREIGN PATENT DOCUMENTS

| | | |
|---|---|---|
| JP | 2015-29416 | 2/2015 |
| JP | 2015-48006 | 3/2015 |
| JP | 2016-111760 A | 6/2016 |
| JP | 2017-208898 A | 11/2017 |

* cited by examiner

*Primary Examiner* — Edwin A Young
(74) *Attorney, Agent, or Firm* — Foley & Lardner LLP

(57) ABSTRACT

A regenerative braking control method and a regenerative braking control device of the present invention control a drive source that generates a regenerative brake force in such a manner that an upper limit of regenerative deceleration when a driver executes manual control becomes smaller than an upper limit of regenerative deceleration when automatic control is executed.

10 Claims, 4 Drawing Sheets

(a) ACCELERATOR OPENING (b) COMMAND TORQUE

REGENERATIVE BRAKING CONTROL METHOD AND REGENERATIVE BRAKING CONTROL DEVICE

TECHNICAL FIELD

The present invention relates to a regenerative braking control method and a regenerative braking control device for a vehicle.

BACKGROUND ART

Patent Literature 1 discloses a regenerative brake controller that controls an electric-powered vehicle so as to obtain a regenerative braking force by controlling an electric motor that drives wheels at a regenerative ratio in accordance with a preset regenerative level.

CITATION LIST

Patent Literature

Patent Literature 1: Japanese Patent Laid-Open Publication No. 2015-29416

SUMMARY OF INVENTION

Technical Problem

In an example disclosed in Patent Literature 1, when the vehicle speed is automatically controlled, the regenerative ratio is controlled such that the regenerative ratio is prohibited from being set lower than a predetermined value. Due to this control, the maximum value of a regenerative braking force during automatic control is limited by a maximum value of possible regenerative level to be set during manual control. Therefore, there is a problem in that a greater regenerative braking force cannot be used during the automatic control as compared to the regenerative braking force during the manual control, and accordingly energy efficiency cannot be improved.

The present invention has been made in view of the above problems, and it is an object of the present invention to provide a regenerative braking control method and a regenerative braking control device that improve energy efficiency during automatic control.

Solution to Problem

In order to solve the above problems, a regenerative braking control method and a regenerative braking control device according to an aspect of the present invention control a drive source that generates a regenerative brake force in such a manner that an upper limit of regenerative deceleration when a driver executes manual control becomes smaller than an upper limit of regenerative deceleration when automatic control is executed.

Advantageous Effects of Invention

According to the present invention, it is possible to reduce the influence on the drivability that a driver feels during manual control while improving energy efficiency during automatic control.

DESCRIPTION OF EMBODIMENTS

Embodiments of the present invention are described below with reference to the accompanying drawings. In the explanations, like parts are denoted by like reference signs and redundant explanations thereof are omitted.

[Configuration of Regenerative Braking Control Device]

Figure 1:
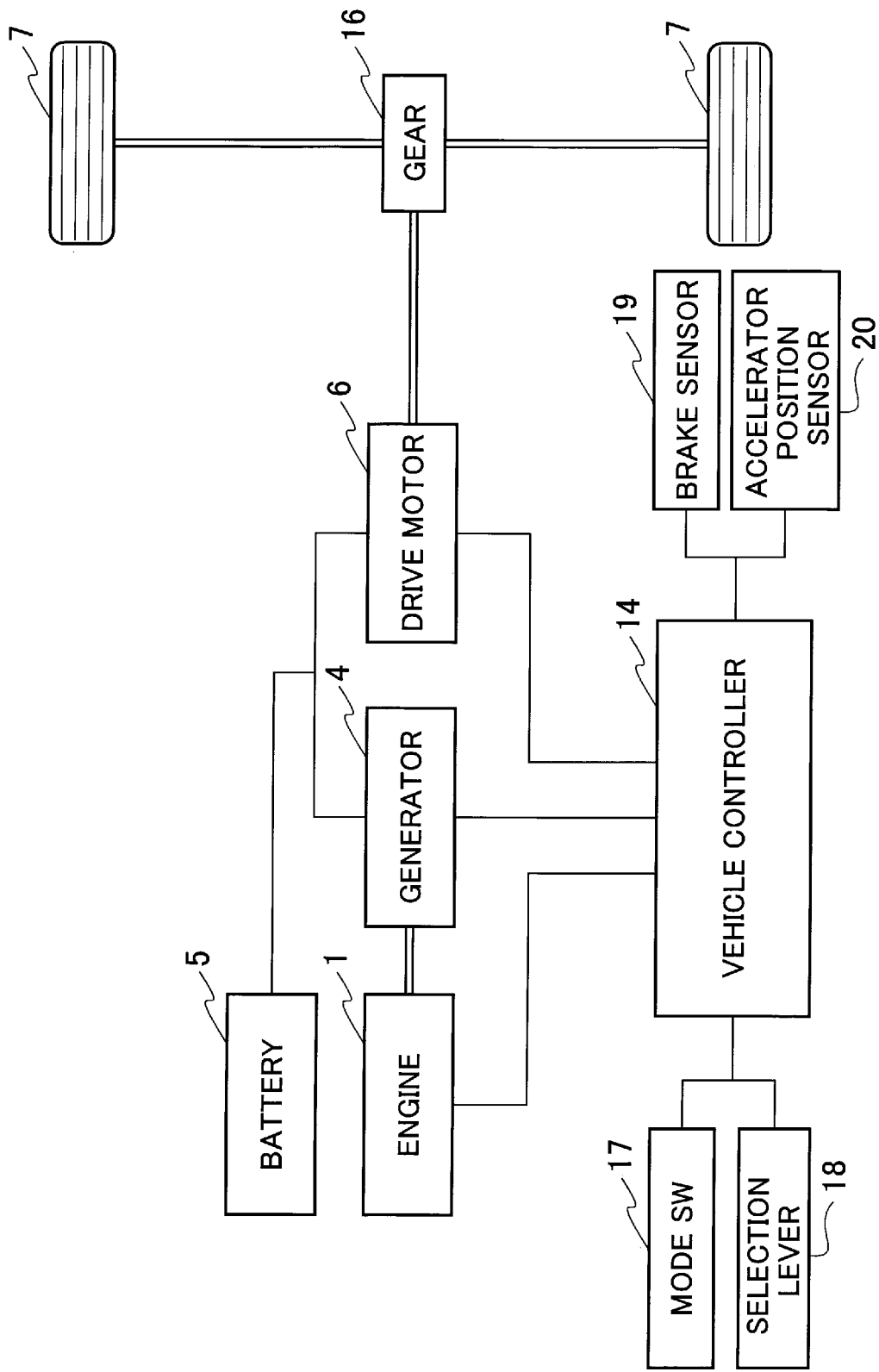
FIG. 1 is a block diagram illustrating a configuration of a hybrid car including a regenerative braking control device according to an embodiment of the present invention.

A configuration of a hybrid car including a regenerative braking control device according to an embodiment of the present invention is described below with reference to FIG. 1. The hybrid car according to the present embodiment includes an engine 1 (internal combustion engine), a generator 4 (electric motor), a battery 5, a drive motor 6 (drive source), and wheels 7 (drive wheels). In the hybrid car, the engine 1 does not drive the wheels 7, but the drive motor 6 drives the wheels 7 by using power from the battery 5. Since the engine 1, the battery 5, the drive motor 6, and the wheels 7 are connected in series (series connection), the hybrid car is referred to as "series hybrid car".

The engine 1 is mechanically connected with the generator 4. The generator 4 is connected to the battery 5 such that the generator 4 is capable of transmitting and receiving power to and from the battery 5. The generator 4 and the drive motor 6 are also connected such that it is possible to transmit and receive power between them. The battery 5 and the drive motor 6 are also connected such that it is possible to transmit and receive power between them. The drive motor 6 is mechanically connected with an axle through a gear 16. The axle is mechanically connected with the wheels 7.

A driving force of the engine 1 is transmitted to the generator 4, and the generator 4 rotates using the driving force of the engine 1 and generates power. When power generated by the generator 4 flows to the battery 5, this power is consumed for charging the battery 5. When power generated by the generator 4 flows to the drive motor 6, this power is consumed for driving of the drive motor 6.

The drive motor 6 is supplied with power from either one or both of the generator 4 and the battery 5. The drive motor 6 consumes the supplied power to generate a driving force. The driving force of the drive motor 6 is transmitted through the gear 16 and the axle to the wheels 7. The wheels 7 rotate using the driving force of the drive motor 6, so that the series hybrid car (hereinafter, abbreviated as "vehicle") runs.

In a case, such as during deceleration of the vehicle or when the vehicle is travelling downhill, where a torque is input from the wheels 7 through the axle and the gear 16 to the drive motor 6, and thus the drive motor 6 rotates using the input torque, the drive motor 6 operates as a generator to generate regenerative power. When regenerative power is generated in the drive motor 6, a reaction of the torque input to the drive motor 6 causes a regenerative brake force to be generated on the wheels 7 through the gear 16 and the axle.

When the regenerative power generated in the drive motor 6 flows to the battery 5, the regenerative power is consumed to charge the battery 5. When the regenerative power generated in the drive motor 6 flows to the generator 4, the regenerative power is consumed to drive the engine 1 and the generator 4 against a resistance of the engine 1 (engine braking).

The battery 5 has a charge and discharge function. When the battery 5 is charged, the battery 5 stores therein energy of the power supplied from the generator 4 or the drive motor 6. When the battery 5 is discharged, the battery 5 supplies the energy stored therein as power to the drive motor 6.

A power flow between the generator 4, the battery 5, and the drive motor 6 may change depending on the respective states of the battery 5 and the drive motor 6, travelling conditions of the vehicle, and other factors such as a power supply-demand status in the entire vehicle including auxiliary devices installed in the vehicle (such as an air-conditioner, a car stereo system, and a navigation system). A power flow between the generator 4, the battery 5, and the drive motor 6 is determined by control executed by a vehicle controller 14 described later.

For example, when the drive motor 6 needs to generate a driving force, it is allowable that power is supplied from the battery 5 to the drive motor 6. When sufficient power cannot be supplied from the battery 5 to the drive motor 6, it is allowable to drive the engine 1 to generate power in the generator 4, so that in addition to the power from the battery 5, the power from the generator 4 is also supplied to the drive motor 6.

When charging of the battery 5 is not completed, it is allowable that regenerative power, generated by the drive motor 6 during deceleration of the vehicle or when the vehicle is travelling downhill, is supplied from the drive motor 6 to the battery 5. Further, in a state where charging of the battery 5 is not completed, it is allowable to drive the engine 1 to generate power in the generator 4 and supply the power from the generator 4 to the battery 5.

When a state of charge (SOC) of the battery 5 is high, it is allowable that regenerative power, generated by the drive motor 6 during deceleration of the vehicle or when the vehicle is travelling downhill, is supplied to the generator 4. In this case, the regenerative power supplied from the drive motor 6 to the generator 4 is consumed by the generator 4 in order to work against the engine braking applied by the engine 1. As a result of this, the regenerative power supplied from the drive motor 6 to the generator 4 is forcibly discharged.

The vehicle further includes a mode switch 17 (a mode SW) that selects one of running modes, a selection lever 18 that is operated by a driver, a brake sensor 19 that detects a braking force, an accelerator position sensor 20 (APS) that detects an accelerator opening, and the vehicle controller 14 that controls the hybrid car in its entirety. The vehicle controller 14 functions as a control circuit that controls the electric device according to the present embodiment.

The vehicle controller 14 is electrically connected to each of the switch 17, the selection lever 18, the brake sensor 19, and the accelerator position sensor 20. The vehicle controller 14 receives a signal indicating a selected running mode from the mode switch 17, receives a signal indicating the selected range from the selection lever 18, receives a signal indicating the brake oil pressure from the brake sensor 19, and receives a signal indicating an accelerator opening Ac of an accelerator pedal (input device) from the accelerator position sensor 20.

The value of the accelerator opening Ac can be equal to or greater than 0 (zero). The accelerator opening Ac, obtained in a state where an accelerator pedal is pressed during manual driving and thereby an output driving force from the drive motor 6 is zero, is referred to as "neutral point" of the accelerator opening Ac. When the accelerator opening Ac is equal to or greater than zero, and is smaller than the neutral point, the drive motor 6 outputs a negative value of a driving force (a brake force) and a regenerative brake force is generated. In contrast, when the accelerator opening Ac is greater than the neutral point, the drive motor 6 outputs a positive value of a driving force.

Examples of the range that is selectable through the selection lever 18 include a drive range (D), a brake range (B), a reverse range (R), a neutral range (N), a parking range (P), and the like.

The drive range (D) and the brake range (B) are used to move the vehicle forward. During manual driving, the brake range (B) is a range within which a greater brake force is generated than the drive range (D) when the accelerator is off (or when the accelerator opening Ac is smaller than the neutral point).

Running modes that are selectable through the mode switch 17 include at least a first driving mode in which driver's manual vehicle control is executed, and a second driving mode in which automatic control is executed. The automatic control executed in the second driving mode includes at least automatically adjusting the speed and the distance between vehicles to be performed by the auto cruise control. In each of the first driving mode and the second driving mode, there are at least three types of selectable drive modes that are economy mode, sporty mode, and normal mode.

The vehicle controller 14 is electrically connected to the engine 1, the generator 4, and the drive motor 6 through a signal line. The vehicle controller 14 controls the engine 1, the generator 4, and the drive motor 6 in order to generate a vehicle driving force FD in the drive motor 6 in accordance with the accelerator opening Ac. Particularly, the vehicle controller 14 transmits a command torque Tc to the drive motor 6.

The vehicle controller 14 controls the driving states of the engine 1, the generator 4, and the drive motor 6, and accordingly the states of other auxiliary devices (not illustrated) are determined, so that a power flow between the generator 4, the battery 5, and the drive motor 6 is determined.

The vehicle controller 14 can be implemented by, for example, a general-purpose microcomputer including a CPU (central processing unit), a memory, and an input/output unit. A computer program (a control program) that causes the microcomputer to function as the vehicle controller 14 is installed in the microcomputer so that the microcomputer executes the computer program. Due to this program, the general-purpose microcomputer functions as the vehicle controller 14.

In the present embodiment, the example is described in which the vehicle controller 14 is implemented by software. Apparently, it is also possible to configure the vehicle controller 14 by preparing dedicated hardware to performing each step of information processing described below. It is also allowable to configure each of the units (31, 33, 35, 37, and 39) included in the vehicle controller 14 by each individual hardware. It is further allowable that the vehicle controller 14 is used in combination with an electronic control unit (ECU) to be used for other vehicle-related controls.

Figure 2:
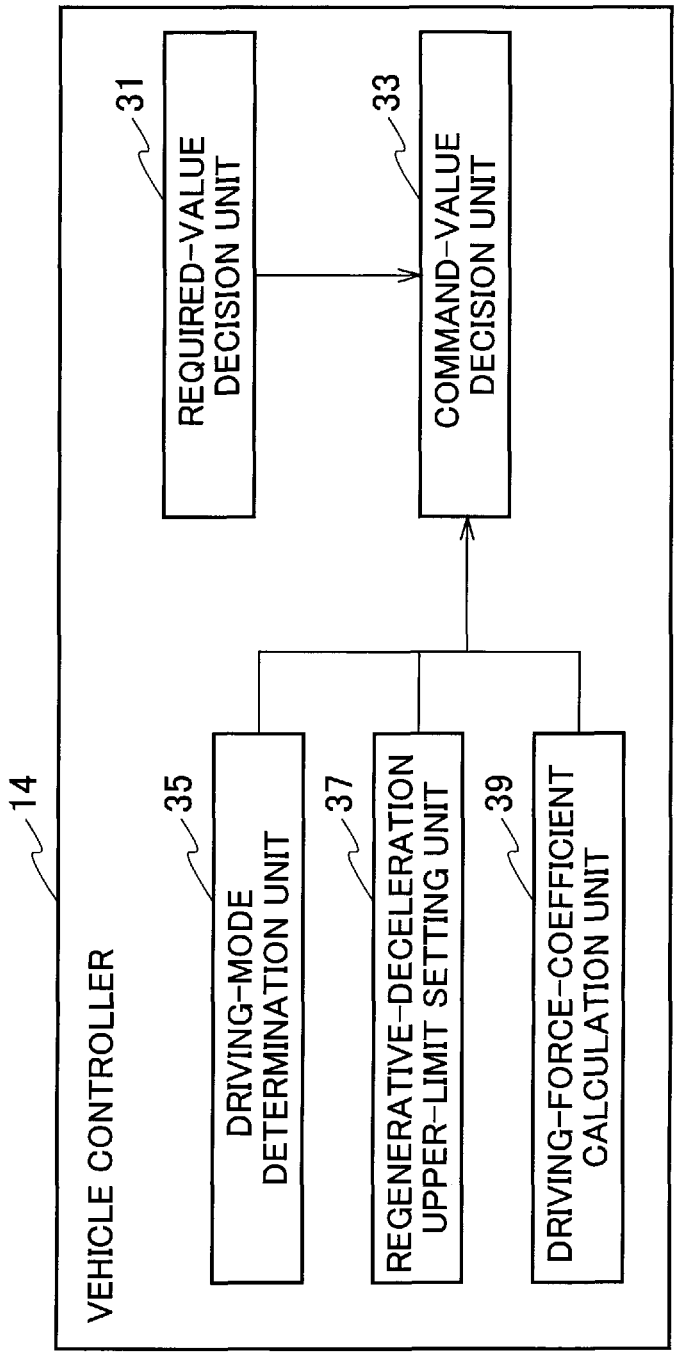
FIG. 2 is a block diagram illustrating functional constituent elements included in a vehicle controller.

Functional constituent elements included in the vehicle controller 14 are described below with reference to FIG. 2. The vehicle controller 14 includes functional constituent elements that are a driving-mode determination unit 35, a regenerative-deceleration upper-limit setting unit 37, a driving-force-coefficient calculation unit 39, a required-value decision unit 31, and a command-value decision unit 33.

On the basis of a signal received from the mode switch 17, the driving-mode determination unit 35 determines which running mode, either the first driving mode or the second driving mode, has been selected by a driver. The driving-mode determination unit 35 further determines which of the drive modes, economy mode, sporty mode, or normal mode, has been selected by the driver.

When the second driving mode is selected by the driver, it is allowable that the driving-mode determination unit 35 determines which of the drive modes, economy mode, sporty mode, or normal mode, has been selected by the automatic control without depending on the signal received from the mode switch 17.

Furthermore, the driving-mode determination unit 35 determines the selected range on the basis of the signal received from the selection lever 18.

The regenerative-deceleration upper-limit setting unit 37 sets an upper limit of regenerative deceleration due to a regenerative brake force (an absolute value of a lower limit of the driving force of the drive motor 6) on the basis of the running mode and the range which are determined by the driving-mode determination unit 35. Specifically, when the selected running mode is determined to be the first driving mode, the regenerative-deceleration upper-limit setting unit 37 sets an upper limit of regenerative deceleration on the basis of Table 1.

TABLE 1

| First driving mode | Drive mode | | |
|---|---|---|---|
| | Economy mode | Sporty mode | Normal mode |
| Range D range | 0.15 G | 0.15 G | 0.06 G |
| B range | 0.15 G | 0.15 G | 0.12 G |

The measurement unit "G" represents gravitational acceleration (standard gravity) where 1 G=9.80665 m/s$^2$. The D range represents drive range. The B range represents brake range.

During manual driving, the B range is set as a range to generate a greater brake force than the D range when the accelerator opening Ac is relatively small. Thus, when the first driving mode is selected, the upper limit of regenerative deceleration due to a regenerative brake force in the normal mode and within the B range is set to 0.12 G. This set value is greater than 0.06 G that is an upper limit of regenerative deceleration due to a regenerative brake force in the normal mode and within the D range.

When the selected running mode is determined to be the second driving mode, the regenerative-deceleration upper-limit setting unit 37 sets an upper limit of regenerative deceleration on the basis of Table 2.

TABLE 2

| Second driving mode | Drive mode | | |
|---|---|---|---|
| | Economy mode | Sporty mode | Normal mode |
| Range D range | 0.12 G | 0.12 G | 0.12 G |
| B range | 0.12 G | 0.12 G | 0.12 G |

In the settings in the second driving mode (Table 2), when the drive mode is the normal mode and the range is the drive range, the upper limit of regenerative deceleration is changed from 0.06 G to 0.12 G as compared to the settings in the first driving mode (Table 1). As described above, a first upper limit (0.06 G as noted above) in the first driving mode due to a regenerative brake force is smaller than a second upper limit (0.12 G as noted above) in the second driving mode.

The second upper limit in the second driving mode is greater than the first upper limit in the first driving mode, so that a greater regenerative brake force can be used in the second driving mode than in the first driving mode. Consequently, more kinetic energy of the vehicle can be recovered by the regenerative brake force. Accordingly, energy efficiency can be improved.

In contrast, in the second driving mode, a common value (0.12 G as noted above) is set as an upper limit of regenerative deceleration for any drive mode. In the second driving mode, a common value (0.12 G as noted above) is set as an upper limit of regenerative deceleration for both the D range and the B range.

The second upper limit in the second driving mode is explained as 0.12 G in the above descriptions. However, it is allowable that a regenerative deceleration corresponding to the maximum value of the regenerative brake force that can be generated by the drive motor 6 is set as a second upper limit in the second driving mode.

In Table 1 and Table 2 noted above, there is no description about setting of the upper limit of regenerative deceleration during the transition period between the first driving mode and the second driving mode. Setting of the upper limit of regenerative deceleration during the transition period is described later.

The required-value decision unit 31 decides a required torque Tm (a required torque Tm under manual control) to be generated in the drive motor 6 on the basis of the accelerator opening Ac received from the accelerator position sensor 20.

When the second driving mode is selected, the required-value decision unit 31 decides a required torque Tma (a required torque Tma under automatic control) to be generated in the drive motor 6 on the basis of the automatic control.

When the accelerator pedal is pressed under the condition that the second driving mode is selected, the driving-force-coefficient calculation unit 39 calculates the ratio between the required torque Tm under the manual control and the required torque Tma under the automatic control. More specifically, at the timing at which the accelerator pedal is pressed and thereby the accelerator opening Ac begins increasing from zero, the driving-force-coefficient calculation unit 39 calculates a value, obtained by dividing a second upper limit in the second driving mode by a first upper limit in the first driving mode, as a driving-force coefficient Cf. Further, the driving-force-coefficient calculation unit 39 calculates a value, obtained by multiplying the required torque Tm under the manual control by the driving-force coefficient Cf, as an override upper-limit acceleration Tmmd.

The command-value decision unit 33 decides an actual command torque Tc for the drive motor 6. More specifically, when the first driving mode is selected, the command-value decision unit 33 decides the required torque Tm under the manual control as the command torque Tc.

When the second driving mode is selected and the accelerator opening Ac is zero, the command-value decision unit 33 decides the required torque Tma under the automatic control as the command torque Tc.

Further, when the second driving mode is selected, and the accelerator pedal is pressed and thereby the accelerator opening Ac is not zero (when so-called "accelerator override" is performed), then the command-value decision unit 33 decides the command torque Tc on the basis of the required torque Tm under the manual control, the required torque Tma under the automatic control, the driving-force coefficient Cf, and the override upper-limit acceleration Tmmd.

Particularly, when the required torque Tm under the manual control is equal to or greater than zero (when the accelerator opening Ac is equal to or greater than the neutral point), the command-value decision unit 33 decides the required torque Tm under the manual control as the command torque Tc. In contrast, when the required torque Tm under the manual control is below zero (when the accelerator opening Ac is smaller than the neutral point), the command-value decision unit 33 decides either the override upper-limit acceleration Tmmd or the required torque Tma under the automatic control, whichever is greater in value, as the command torque Tc.

Particularly, when the required torque Tm under the manual control is below zero, the command-value decision unit 33 decides either the override upper-limit acceleration Tmmd or the required torque Tma under the automatic control, whichever is greater in value, as the command torque Tc. This ensures that as the required torque Tm under the manual control continuously changes from a negative value to a positive value, the command torque Tc also continuously changes from a negative value to a positive value.

Conversely, this ensures that as the required torque Tm under the manual control continuously changes from a positive value to a negative value, the command torque Tc also continuously changes from a positive value to a negative value.

The vehicle controller 14 controls the drive motor 6 on the basis of the command torque Tc decided for the drive motor 6 in the manner as described above. In addition to that, the vehicle controller 14 controls the generator 4 and the battery 5 such that when regenerative power is generated by the drive motor 6, the generated regenerative power is forcibly discharged by the generator 4 or is used to charge the battery 5.

During both the first driving mode and the second driving mode, there may be a case where a brake force is needed which exceeds the upper limit of regenerative deceleration having been set by the regenerative-deceleration upper-limit setting unit 37. In that case, in addition to the regenerative brake force generated by the drive motor 6, a friction brake (not illustrated) is used to achieve a brake force exceeding the upper limit of regenerative deceleration.

[Driving Force Control During Mode Transition]

Next, the transition between the first driving mode and the second driving mode in the present embodiment is described with reference to the timing chart in FIG. 3.

Figure 3:
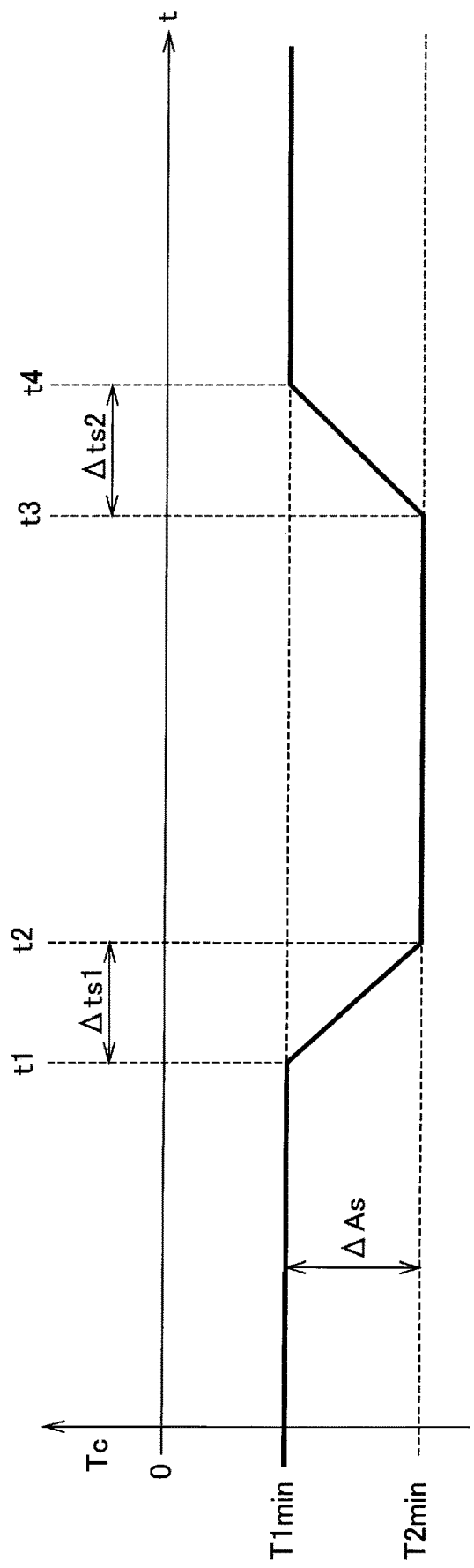
FIG. 3 is a timing chart illustrating a transition between a first driving mode and a second driving mode in the embodiment of the present invention.

In an example illustrated in the timing chart in FIG. 3, the first driving mode is selected during the period before a time t1 and the period after a time t4, while the second driving mode is selected during the period from a time t2 to a time t3. The period from the time t1 to the time t2 is a transition period from the first driving mode to the second driving mode. The period from the time t3 to the time t4 is a transition period from the second driving mode to the first driving mode. The length of the period from the time t1 to the time t2 is defined as Δts1. The length of the period from the time t3 to the time t4 is defined as Δts2.

For simplicity of description, in the example illustrated in the timing chart in FIG. 3, the accelerator opening Ac is assumed to be zero, while the required torque Tm under the manual control is assumed to be a minimum value T1min. Further, the required torque Tma under the automatic control is assumed to be a minimum value T2min. That is, it is assumed in both the first driving mode and the second driving mode that the drive motor 6 generates a maximum regenerative brake force. This case corresponds to a case, for example, where the manual control is switched to the automatic control or where the automatic control is switched to the manual control under the condition that the vehicle is travelling downhill.

As illustrated in FIG. 3, during the period from the time t1 to the time t2, the upper limit of regenerative deceleration increases, and the command torque Tc changes from T1min to T2min. The amount of change in regenerative deceleration is defined as ΔAs. FIG. 3 illustrates ΔAs without particularly distinguishing the command torque Tc from the regenerative deceleration.

An abrupt increase in the upper limit of regenerative deceleration, or an abrupt change in the command torque Tc associated with the increase in the upper limit may cause vehicle occupants to feel discomfort. It is thus desirable that the difference ΔAs between the first upper limit in the first driving mode (equivalent to |T1min|) and the second upper limit in the second driving mode (equivalent to |T2min|) is equal to or smaller than a predetermined value.

Further, during the period from the time t1 to the time t2, it is desirable to set the rate of change ΔAs/Δts1 in the upper limit of regenerative deceleration to approximately 0 to 0.1 G/s. More specifically, it is desirable to set the rate of change ΔAs/Δts1 in the upper limit of regenerative deceleration to a value not exceeding 0.08 G/s.

During the period from the time t3 to the time t4, the upper limit of regenerative deceleration decreases, and the command torque Tc changes from T2min to T1min. In this case also, similarly to the period from the time t1 to the time t2, it is desirable to set the rate of change ΔAs/Δts2 in the upper limit of regenerative deceleration to approximately 0 to 0.1 G/s. More specifically, it is desirable to set the rate of change ΔAs/Δts2 in the upper limit of regenerative deceleration to a value not exceeding 0.08 G/s.

As described above, it is desirable that during the transition period between the first driving mode and the second driving mode, the rate of change in the upper limit of regenerative deceleration falls within a predetermined range. This can result in a reduction in discomfort felt by vehicle occupants during the running-mode transition period.

In the above descriptions, the accelerator opening Ac is zero, the required torque Tm under the manual control is the minimum value T1min, and further the required torque Tma under the automatic control is the minimum value T2min. However, without limiting to these conditions, the present embodiment may also be applicable to a case where the accelerator pedal is pressed and thereby the required torque Tm under the manual control is varied, and a case where the accelerator pedal is pressed and thereby the required torque Tma under the automatic control is varied.

[Driving Force Control During Accelerator Override]

Figure 4:
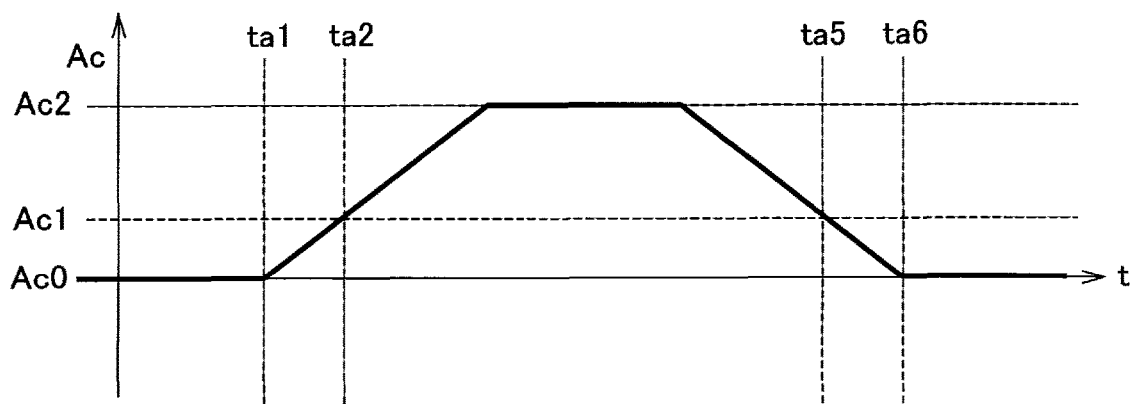
FIG. 4 are timing charts illustrating a status when a driver performs an accelerator operation in the second driving mode in the embodiment of the present invention, where (a) illustrates a change in an accelerator opening, and (b) illustrates a change in command torque.
Figure 4:
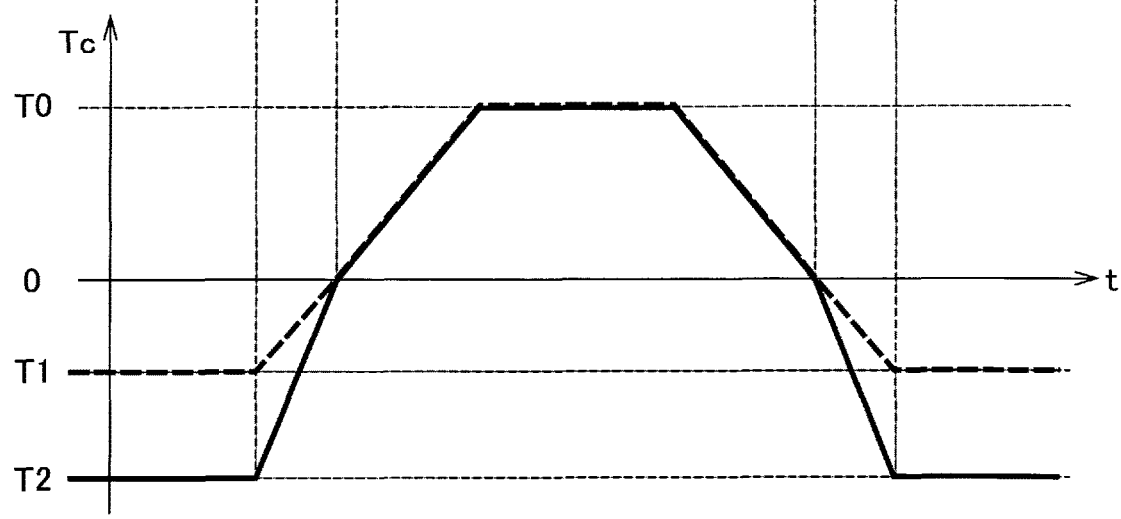

The status when a driver performs an accelerator operation in the second driving mode in the present embodiment is described with reference to the timing charts in FIGS. 4(a)

and 4(*b*). FIG. 4(*a*) illustrates a change in the accelerator opening, and FIG. 4(*b*) illustrates a change in the command torque for the drive motor 6.

In the example illustrated in the timing charts in FIGS. 4(*a*) and 4(*b*), the second driving mode is selected as a running mode. During the period before a time ta1 and the period after a time ta6, the accelerator opening Ac is zero. During the period from the time ta1 to the time ta6, the accelerator pedal is pressed and thereby the value of the accelerator opening Ac is not zero. In FIG. 4(*b*), a value T1 indicates a lower limit of the required torque Tm (dotted line) under the manual control, and a value T2 indicates a lower limit of the required torque Tma (solid line) under the automatic control. That is, |T1| is equivalent to the first upper limit in the first driving mode, while |T2| is equivalent to the second upper limit in the second driving mode.

The period from the time ta1 to the time ta2 is a period in which the value of the accelerator opening Ac is equal to or smaller than a neutral point Ac1. At the time ta2, the accelerator opening Ac becomes the neutral point Ac1. Similarly, the period from a time ta5 to the time ta6 is a period in which the value of the accelerator opening Ac is equal to or smaller than the neutral point Ac1. At the time ta5, the accelerator opening Ac becomes the neutral point Ac1. In contrast, during the period from the time ta2 to the time ta5, the value of the accelerator opening Ac is equal to or greater than the neutral point Ac1.

When a vehicle driver presses the accelerator pedal in a state where the second driving mode is selected and the automatic control is executed, then the driver's operation of the accelerator pedal is prioritized over the automatic control, and the driver's operation-based control is executed. The driving force control executed by the driver in the second driving mode in the manner as described above is called "accelerator override".

However, if the control state in which the required torque Tma under the automatic control is decided as the command torque Tc is suddenly shifted to a control state in which the required torque Tm under the manual control is decided as the command torque Tc, the command torque Tc changes irregularly. This may possibly cause occupants to feel discomfort through the vehicle driving force. In order to reduce this discomfort, the command-value decision unit 33 adjusts the command torque Tc such that the command torque Tc changes continuously as illustrated in FIG. 4(*b*) in accordance with a change in the accelerator opening Ac as illustrated in FIG. 4(*a*).

When the value of the accelerator opening Ac is equal to or greater than the neutral point Ac1 in the second driving mode (during the period from the time ta2 to the time ta5), the required torque Tm under the manual control is equal to or greater than zero as illustrated by the dotted line in the timing chart in FIG. 4(*b*). In this case, the command-value decision unit 33 decides the required torque Tm under the manual control as the command torque Tc.

In contrast, when the value of the accelerator opening Ac is below the neutral point Ac1, the command torque Tc is changed at a greater rate of change than the rate of change in the required torque Tm under the manual control calculated on the basis of the accelerator opening Ac. More specifically, a value obtained by dividing the second upper limit (|T2|) at the time ta1 by the first upper limit (|T1|) at the time ta1 is calculated as the driving force coefficient Cf. Subsequently, a value obtained by multiplying the required torque Tm under the manual control by the driving force coefficient Cf is defined as the override upper-limit acceleration Tmmd. Either the required torque Tma under the automatic control or the override upper-limit acceleration Tmmd, whichever is greater in value (the required torque Tma when these values are equal), is defined as the command torque Tc.

During the period from the time ta1 to the time ta2, either the required torque Tma under the automatic control or the override upper-limit acceleration Tmmd, whichever is greater in value, is defined as the command torque Tc. This ensures that the command torque Tc changes continuously before and after the time ta2.

Further, during the period from the time ta5 to the time ta6, either the required torque Tma under the automatic control or the override upper-limit acceleration Tmmd, whichever is greater in value, is defined as the command torque Tc. This ensures that the command torque Tc changes continuously before and after the time ta5.

Effects of the Embodiment

As described above in detail, when the regenerative braking control method and the regenerative braking control device according to the present embodiment control the drive motor 6 (drive source) that generates a regenerative brake force and that is installed in a vehicle that is switchable between the first driving mode in which a driver executes manual control and the second driving mode in which automatic control is executed, the first upper limit of regenerative deceleration in the first driving mode due to the regenerative brake force is set smaller than the second upper limit of the regenerative deceleration in the second driving mode. Due to this setting, a greater regenerative brake force can be used in the second driving mode than that in the first driving mode.

Consequently, more kinetic energy of the vehicle can be recovered by the regenerative brake force. Accordingly, energy efficiency can be improved. Particularly, fuel economy and power efficiency of the vehicle can be improved.

Further, the first upper limit of regenerative deceleration in the first driving mode due to the regenerative brake force is set smaller than the second upper limit of the regenerative deceleration in the second driving mode. This minimizes the maximum deceleration during the manual control. Thus, even when the accelerator pedal is released and thereby the accelerator opening Ac is relatively small, the brake force is reduced and accordingly smooth driving can still be achieved.

In the regenerative braking control method and the regenerative braking control device according to the present embodiment, the difference between the first upper limit and the second upper limit may be equal to or smaller than a predetermined value. This difference can reduce discomfort felt by vehicle occupants during the transition between the first driving mode and the second driving mode.

Furthermore, in the regenerative braking control method and the regenerative braking control device according to the present embodiment, the rate of change in the upper limit of regenerative deceleration during the transition between the first driving mode and the second driving mode may fall within a predetermined range. Due to this rate of change, the vehicle driving force can be changed smoothly during the transition between the first driving mode and the second driving mode. This can reduce the discomfort felt by vehicle occupants.

In the regenerative braking control method and the regenerative braking control device according to the present embodiment, the second upper limit may be a maximum value of the regenerative brake force that can be generated by the drive motor 6. This makes it possible to maximize usage of the regenerative brake force that can be generated by the drive motor 6 and thus recover more kinetic energy of the vehicle under the automatic control. Accordingly, energy efficiency can be improved.

Furthermore, in the regenerative braking control method and the regenerative braking control device according to the present embodiment, the regenerative deceleration in the first driving mode may be calculated on the basis of a command value received from the driver through an input device through which the driver inputs a requirement for an acceleration and a deceleration. Particularly, the input device may be an accelerator pedal.

The maximum value of possible input value to the input device is associated with the maximum value of the driving force of the drive motor 6. The minimum value of possible input value to the input device is associated with the minimum value of the driving force of the drive motor 6. Thus, the first upper limit is set smaller than the second upper limit, so that a change in the driving force of the drive motor 6 per unit amount of change in possible input value to the input device can become less significant. Consequently, a driver can more easily operate the input device in accordance with a target value of a vehicle driving force. Undershoot/overshoot relative to the target value of the vehicle driving force is less likely to occur, and the drivability of the vehicle improves.

While a regenerative deceleration in the first driving mode is decided on the basis of a command value received from the driver through the input device, a regenerative deceleration in the second driving mode is decided on the basis of automatic control. In the case of automatic control, the regenerative deceleration in the second driving mode is accurately decided in accordance with the target value of the vehicle driving force. This does not cause a problem with undershoot/overshoot relative to the target value of the vehicle driving force. As a result, an improvement in the drivability of the vehicle during manual driving and an improvement in energy efficiency by increasing the upper limit of a regenerative brake force during the automatic control can both be achieved.

Further, in the regenerative braking control method and the regenerative braking control device according to the present embodiment, when a driver provides a driving-force instruction (a change in the accelerator opening Ac) in the second driving mode, the required torque Tm (first required acceleration) under the manual control may be calculated on the basis of the driving-force instruction. When the required torque Tm is equal to or greater than zero, the required torque Tm may be set as the command torque Tc. When the required torque Tm is below zero, the command torque Tc may be changed at a rate of change greater than the rate of change in the required torque Tm. This configuration can ensure that the command torque Tc changes continuously when the accelerator pedal is pressed during the automatic control and accelerator override is performed. Consequently, when the accelerator override is performed, an abrupt change in the vehicle driving force can be prevented, and this can reduce vehicle occupants' discomfort.

In the regenerative braking control method and the regenerative braking control device according to the present embodiment, when the required torque Tm is below zero, a value obtained by dividing the second upper limit at a timing of starting the driving-force instruction by the first upper limit at this timing may be calculated as the driving force coefficient Cf (predetermined coefficient). A value obtained by multiplying the required torque Tm by the driving force coefficient Cf may be calculated as the override upper-limit acceleration Tmmd. Either the required torque Tma (second required acceleration) under the automatic control or the override upper-limit acceleration Tmmd, whichever is greater in value, may be defined as the command torque Tc. This configuration can ensure that the command torque Tc changes continuously when the accelerator pedal is pressed during the automatic control and accelerator override is performed. Consequently, when the accelerator override is performed, an abrupt change in the vehicle driving force can be prevented, and this can reduce vehicle occupants' discomfort.

Further, in the regenerative braking control method and the regenerative braking control device according to the present embodiment, when a brake force (required brake force or required deceleration) exceeding the upper limit (first upper limit and second upper limit) of regenerative deceleration is needed, a friction brake is used in addition to the regenerative brake force generated by the drive motor 6 to achieve the brake force exceeding the upper limit of regenerative deceleration. Due to this configuration, a required brake force can be generated more reliably, a brake force can be guaranteed during travel of the vehicle, and the vehicle can be decelerated reliably.

Lastly, in considering the effects of the regenerative braking control method and the regenerative braking control device according to the present embodiment, the differences between an engine-driven vehicle and a vehicle with its axle rotated by an electric motor are additionally explained.

When the engine rotates the axle of the vehicle, the transmission gear ratio may be variable in accordance with mode selection such as range selection or in accordance with the driving state (manual control/automatic control). In such an engine-driven vehicle as described above, the rotational speed of the engine is changed at the time of mode selection, and thereby occupants may sense the change in sound. For this reason, in order to reduce occupants' discomfort, in the engine-driven vehicle, usually the change in sound is set so as to become less significant before and after selection of the mode or the driving state. The upper limit of deceleration remains unchanged.

In contrast, in a vehicle with its axle rotated by an electric motor, such as a vehicle to which the regenerative braking control method and the regenerative braking control device according to the present embodiment are applied, the engine is not directly connected with the axle, and instead of the engine, the electric motor rotates the axle. An electric motor has characteristics in that the variable range of output shaft torque and rotational speed of the electric motor is wider than that of the engine. Thus, even when the transmission gear ratio of the gear 16 interposed between the electric motor and the axle is fixed, it is still possible to sufficiently drive the axle. Consequently, occupants feel only an insignificant sound change caused due to a change in rotational speed of the electric motor at the time of mode selection.

That is, in a vehicle with its axle rotated by an electric motor, it is unnecessary to consider a sound change before and after selection of the mode or driving state. Even when the upper limit of deceleration is changed before and after selection of the mode or driving state, occupants still do not feel discomfort. Therefore, a vehicle with its axle rotated by an electric motor has greater flexibility in changing the upper limit of deceleration than an engine-driven vehicle.

As described above, as compared to an engine-driven vehicle, a vehicle with its axle rotated by an electric motor is more advantageous in changing the upper limit of deceleration.

Although the contents of the present invention have been described above with reference to the embodiments, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

Respective functions described in the above embodiments may be implemented by one or more processing circuits. The processing circuits include programmed processors such as a processor including an electric circuit. The processors also include devices such as an application specific integrated circuit (ASIC) and conventional circuit elements that are arranged to execute the functions described in the embodiments.

REFERENCE SIGNS LIST 1 engine
4 generator
5 battery
6 drive motor
7 wheels
14 vehicle controller
16 gear
17 mode switch
18 selection lever
19 brake sensor
20 accelerator position sensor
31 required-value decision unit
33 command-value decision unit
35 driving-mode determination unit
37 regenerative-deceleration upper-limit setting unit
39 driving-force-coefficient calculation unit

The invention claimed is:

1. A regenerative braking control device comprising a control circuit that controls a drive source that generates a regenerative brake force and that is installed in a vehicle that is switchable by a selection of a driver between a first driving mode in which the driver executes manual control and a second driving mode in which automatic control is executed, wherein
the manual control includes at least adjusting, based on an operation of the driver, a speed of the vehicle and a distance between the vehicle and at least another vehicle,
the automatic control includes at least automatically adjusting the speed of the vehicle and the distance between the vehicle and at least another vehicle, and
a first upper limit of regenerative deceleration in the first driving mode due to the regenerative brake force is set smaller than a second upper limit of the regenerative deceleration in the second driving mode, wherein
in the second driving mode,
a first required acceleration is calculated on a basis of a driving-force instruction from the driver,
a driving-force command value output to the drive source is changed at a rate of change greater than or equal to a rate of change of the first required acceleration.

2. The regenerative braking control device according to claim 1, wherein
a difference between the first upper limit and the second upper limit is equal to or smaller than a predetermined value.

3. The regenerative braking control device according to claim 1, wherein
a rate of change of an upper limit of the regenerative deceleration during a transition between the first driving mode and the second driving mode falls within a predetermined range.

4. The regenerative braking control device according to claim 1, wherein
the second upper limit is a maximum value of the regenerative brake force that can be generated by the drive source.

5. The regenerative braking control device according to claim 1, wherein
the regenerative deceleration in the first driving mode is calculated on a basis of a command value received from the driver through an input device through which the driver inputs a requirement for an acceleration or a deceleration.

6. The regenerative braking control device according to claim 5, wherein
the input device is an accelerator pedal.

7. The regenerative braking control device according to claim 1, wherein
in the second driving mode,
when the first required acceleration is equal to or greater than zero, the first required acceleration is set as the driving-force command value, and
when the first required acceleration is below zero, the driving-force command value is changed at a rate of change greater than the rate of change of the first required acceleration.

8. The regenerative braking control device according to claim 7, wherein
when the first required acceleration is below zero,
a value obtained by dividing the second upper limit at a timing of starting the driving-force instruction by the first upper limit at the timing is calculated as a predetermined coefficient, and
a value obtained by multiplying the first required acceleration by the predetermined coefficient is calculated as an override upper-limit acceleration, and either a second required acceleration on a basis of the automatic control or the override upper-limit acceleration, whichever is greater in value, is defined as the driving-force command value.

9. The regenerative braking control device according to claim 1, wherein
when a required deceleration is above the first upper limit in the first driving mode, the required deceleration is generated using the drive source and a friction brake installed in the vehicle.

10. The regenerative braking control device according to claim 1, wherein
when a required deceleration is above the second upper limit in the second driving mode, the required deceleration is generated using the drive source and a friction brake installed in the vehicle.

\* \* \* \* \*